US009809241B2

(12) United States Patent
Polidoros

(10) Patent No.: US 9,809,241 B2
(45) Date of Patent: Nov. 7, 2017

(54) TABLE TRUCK

(75) Inventor: Nicholas Polidoros, Mitcham (AU)

(73) Assignee: IHS GLOBAL DESIGN PTY LTD, Rowville, Victoria (AU)

( * ) Notice: Subject to any disclaimer, the term of this patent is extended or adjusted under 35 U.S.C. 154(b) by 109 days.

(21) Appl. No.: 12/793,767

(22) Filed: Jun. 4, 2010

(65) Prior Publication Data

US 2010/0310346 A1   Dec. 9, 2010

(30) Foreign Application Priority Data

Jun. 5, 2009   (AU) .................................. 2009902600

(51) Int. Cl.
B65F 1/00 (2006.01)
B62B 3/04 (2006.01)
B62B 3/10 (2006.01)

(52) U.S. Cl.
CPC ................ B62B 3/04 (2013.01); B62B 3/108 (2013.01); B62B 2202/30 (2013.01); B62B 2203/07 (2013.01)

(58) Field of Classification Search
CPC ........................................................ B60P 1/36
USPC ........................................................ 414/523
See application file for complete search history.

(56) References Cited

U.S. PATENT DOCUMENTS 2,621,815 A     12/1952 Gannon
5,037,117 A *   8/1991 Hershberger ........... B62B 3/108
                                              280/35
5,405,236 A *   4/1995 Sundstrom et al. .......... 414/495
6,360,797 B1*   3/2002 Brazell ................ B23D 47/025
                                            144/286.1
6,709,222 B2    3/2004 Inman, Jr.
7,219,905 B1*   5/2007 Wilson ...................... B62B 3/02
                                              280/79.3

(Continued)

FOREIGN PATENT DOCUMENTS

DE              29510784        9/1995
WO          WO 01/44036         6/2001
WO          WO 2007/115370      10/2007

OTHER PUBLICATIONS

European Search Report dated Oct. 23, 2013 for Application No. EP 101649343.1.

(Continued)

Primary Examiner — Saul Rodriguez
Assistant Examiner — Willie Berry, Jr.
(74) Attorney, Agent, or Firm — Frost Brown Todd LLC

(57) ABSTRACT

A table truck 10 for carrying multiple roller-carrying tables 12, the table truck comprises a bass 22 with ground wheels or castors 24. A frame 26 on the base 22 defines a storage space for multiple roller-carrying tables 12 standing generally upright on the base 22. A ramp 40 is mounted to the base 22 or frame 26, reconfigurable between a transport condition clear of the ground and an operative condition contacting or almost contacting the ground for rolling the tables in turn, in a tilted position with rollers engaging the ramp to roll therealong, up the ramp 40 onto the base 22 or down the ramp 40 from the base 22. Frame 26 further comprises pivotal arms capable of projecting into the storage space for defining respective rest locations for the respective tables when they are standing generally upright on the base.

8 Claims, 4 Drawing Sheets

(56) References Cited

U.S. PATENT DOCUMENTS

2003/0075888 A1* 4/2003 Buckley .................. 280/33.992
2006/0103094 A1* 5/2006 Wiff et al. ................. 280/79.11

OTHER PUBLICATIONS

EPO Communication dated Oct. 31, 2013 for Application No. EP 101649343.1.

* cited by examiner

TABLE TRUCK

FIELD OF THE INVENTION

The present invention relates to table trucks, trolleys, and the like, for manually transporting rollaway tables. Rollaway tables include at least one roller for moving the tables, when in a folded position. Rollaway tables are typically those used in the catering industry and by places such as hotels, convention centres, schools, and other institutions having a need for transitory tables.

BACKGROUND OF THE INVENTION

Catering tables can usually be folded such that their legs lie underneath the table top. The tables are typically transported on trucks or trolleys that are manually maneuverable. The tables are stacked on the trolley by lifting the tables and lying them across the base of the truck. Due to the size and weight of the tables, they cannot be lifted by a single person and require at least two people to load and unload the tables. Due to the width of the loaded truck, there is often a need for two people to manoeuvre the truck between the storage location and the room in which the tables are to be set up for use.

To assist with the ease of setting up a large number of catering tables, rollaway tables have been developed that include rollers at one end of a generally rectangular table top. When the legs are folded, the table is able to be maneuvered by placing one end of the table top on the ground and tilting the other end. The rollers engage the ground and the table can be rolled into position for setting up.

Whilst rollaway tables make the positioning of individual tables more efficient and easier for one person to manoeuvre, they are still required to be lifted individually onto table trucks to transport multiple tables into and out of storage.

It is therefore an object of the present invention to provide an improved way to transport tables with rollers, which is able to be accomplished by a single person.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

Accordingly, the present invention provides a table truck for carrying multiple roller-carrying tables, the table truck comprising:
 a base with ground wheels or castors;
 a frame on the base that defines a storage space for multiple roller-carrying tables standing generally upright on the base;
 a ramp mounted to the base or frame, reconfigurable between a transport condition clear of the ground and an operative condition contacting or almost contacting the ground for rolling the tables in turn, in a tilted position with said rollers engaging the ramp to roll therealong, up the ramp onto the base or down the ramp from the base; and
 means on the frame capable of projecting into said storage space for defining respective rest locations for the respective tables when they are standing generally upright on the base.

Said means defining respective rest locations is preferably a plurality of pivotal means moveable between an inoperative position to allow the tables to be rolled onto the base and an operative position where the pivotal means define said respective rest locations. In the operative position, the pivotal means project, preferably generally horizontally, into the storage space. In the inoperative position, the pivotal means do not project into the storage space and preferably lie generally vertically.

The base is preferably generally rectangular. The frame preferably includes an upright member extending from each of the four corners of the base. Upper generally horizontal cross beams preferably join the upright members on three sides of the base, to leave an open side of the frame, and therefore are preferably two side cross beams and one rear cross beam. The rear cross beam may define a handle for manually maneuvering the table truck. Additional upright members and cross beams may be incorporated into the frame.

The ramp is preferably mounted to extend across the width of the base, and preferably between two upright members on the open side of the frame. The movement of the ramp may be assisted by means such as gas struts.

The pivotal means are preferably mounted to the two upper side cross beams of the frame. Each individual pivotal means may be separately moveable.

The respective rest locations preferably position the tables such that the width of the table is generally aligned with the width of the base.

According to a second aspect of the invention, there is provided a table truck for carrying multiple roller-carrying tables, the table truck comprising:
 a base with ground wheels or castors;
 a frame on the base that defines a storage space for multiple roller-carrying tables standing generally upright on the base; and
 a plurality of pivotal means on the frame moveable between an inoperative position to allow the tables to be moved onto the base and an operative position where the pivotal means define respective rest locations for the respective tables when they are standing generally upright on the base.

In the operative position, the pivotal means project, preferably generally horizontally, into the storage space. In the inoperative position, the pivotal means do not project into the storage space and preferably lie generally vertically.

The base is preferably generally rectangular. The frame preferably includes an upright member extending from each of the four corners of the base. Upper generally horizontal cross beams preferably join the upright members on three sides of the base, to leave an open side of the frame, and therefore are preferably two side cross beams and one rear cross beam. The rear cross beam(s) may define a handle for manually maneuvering the table truck. Additional upright members and cross beams may be incorporated into the frame.

Preferably, a ramp is mounted to the base or frame, reconfigurable between a transportation condition clear of the ground and an operative condition contacting the ground, for rolling the tables in turn, in a tilted position with said rollers engaging the ramp to roll the table up the ramp onto the base or down the ramp from the base.

The ramp is preferably mounted to extend across the width of the base, and preferably between two upright members on the open side of the frame. The movement of the ramp may be assisted by means such as gas struts.

The pivotal means are preferably mounted to the two upper side cross beams of the frame. Each individual pivotal means may be separately moveable.

The respective rest locations preferably position the tables such that the width of the table is generally aligned with the width of the base.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

The invention will now be described, by way of example only, with reference to the accompanying drawings, in which.

DETAILED DESCRIPTION OF THE EMBODIMENTS

Figure 1:
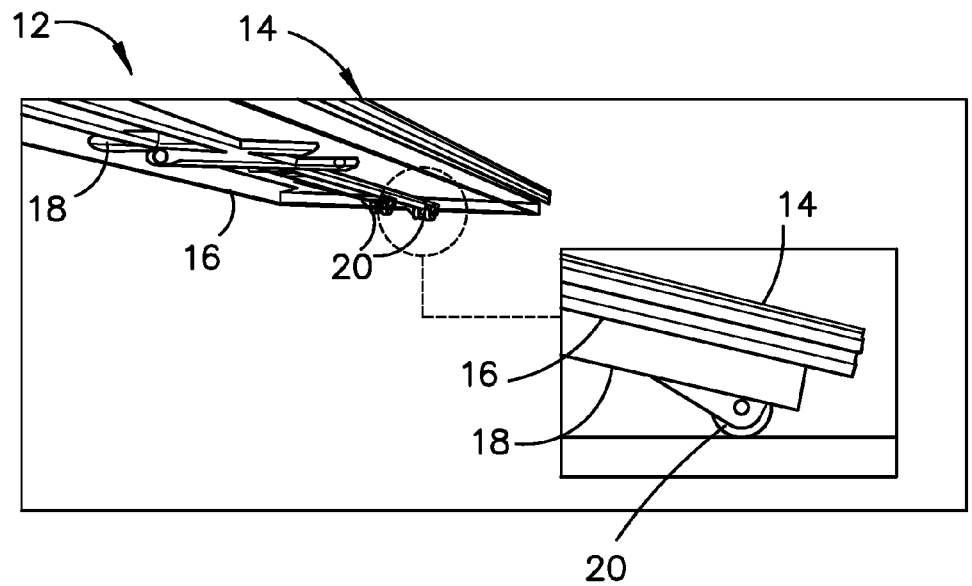
FIG. 1 is a perspective view and close up side view of a rollaway table in the rolling position for use with a table truck according to the present invention.

A table truck 10 is used to transport multiple rollaway tables 12. A type of rollaway table 12 is illustrated in FIG. 1 and includes a table surface 14 having an underside 16 and foldable legs 18. On the underside 16 of the table surface, at at least one end, there are two spaced apart rollers 20 that allow the table to be rolled around, making setting up of the tables easier and quicker for a single person to accomplish. The table 12 illustrated actually includes a set of rollers at both ends of the table surface 14.

Figure 7:
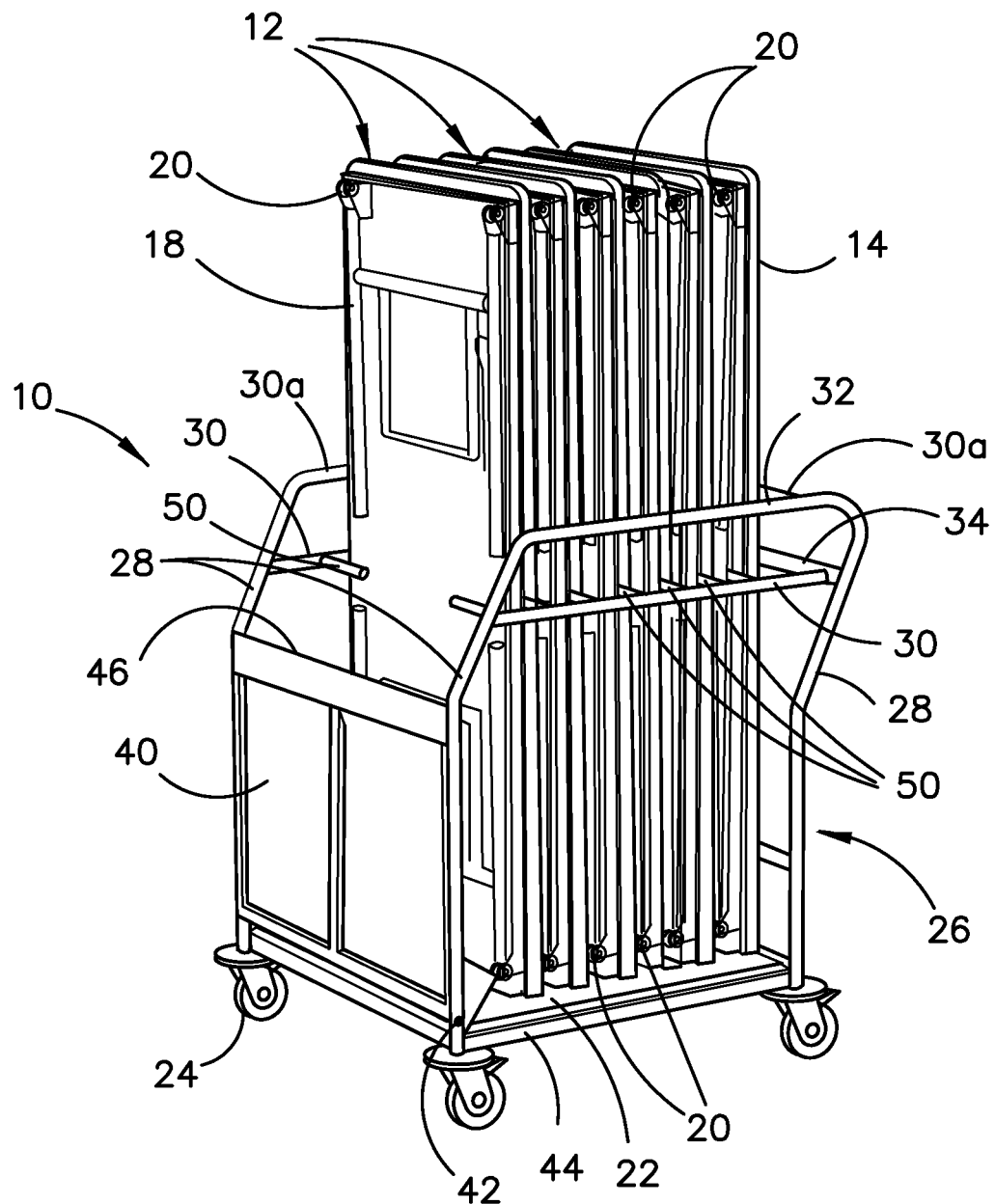
FIG. 7 is a perspective view from the other end of a table truck according to another embodiment of the present invention.

The table truck 10 includes a base 22 with ground wheels or castors; in the embodiment illustrated in FIGS. 1 to 6 six castors 24 are provided, and in the embodiment shown in FIG. 7 four castors 24 are provided. A frame 26 is mounted on the base 22 and includes four generally upright members 28 extending from each corner of the generally rectangular base 22. Upper generally horizontal cross beams 30, 30a are provided extending between two upright members 28 on the sides of the frame and another cross beam 32 extends between two upright members 28 at the rear of the frame 26. These members define a storage space for the tables 12 and create an open side of the frame 26 to enable the tables 12 to be moved onto the base 22. A projecting broadly U-shaped handle 34 extends across the rear of the frame, parallel to the cross beam 32 to assist in maneuvering the table truck 10. The uppermost side cross beams 30a are also used to manoeuvre the table truck 10. In the embodiment illustrated in FIG. 7, the upper portion of the upright members 28 are angled rearwardly, creating the handle 34.

The upright members 28, cross beams 30, 30a and handle 34 are made from tubular steel and the corners respectively joining them are curved to improve the comfort to the user. The base 22 is preferably made from plastic or metal.

A ramp 40 is mounted to either the base or the frame. In the embodiment illustrated it is pivotally mounted to the frame, by means of pins 42 projecting through apertures 44 provided in upright members 28. The ramp is preferably made from moulded plastic to provide strength whilst being light weight.

The ramp 40 is reconfigurable, by pivoting, between a transport condition (shown in FIGS. 6 and 7) and an operative condition (FIGS. 2 to 5). In the transport condition, the ramp is clear of the ground to allow movement of the table truck 10. The ramp 40 is mounted to extend across the width of the base and lies against the front frame members 28 in the transport condition, thereby acting as a gate that closes off the front side of the table storage space. In the operative condition, the edge 46 of the ramp 40 contacts the ground, allowing the rollers 20 to engage the ramp 40 and the tables 12 to be rolled, in a tilted position, up the ramp 40 onto the base 22 and into the storage space, or down the ramp 40 from the base 22. The tables 12 are rolled with their width extending across the width of the base 22, such that the two rollers 20 move substantially in parallel, side by side, up the ramp and are stored in this orientation on the base 22. The movement of the ramp may be assisted by the use of gas struts (not shown).

Figure 2:
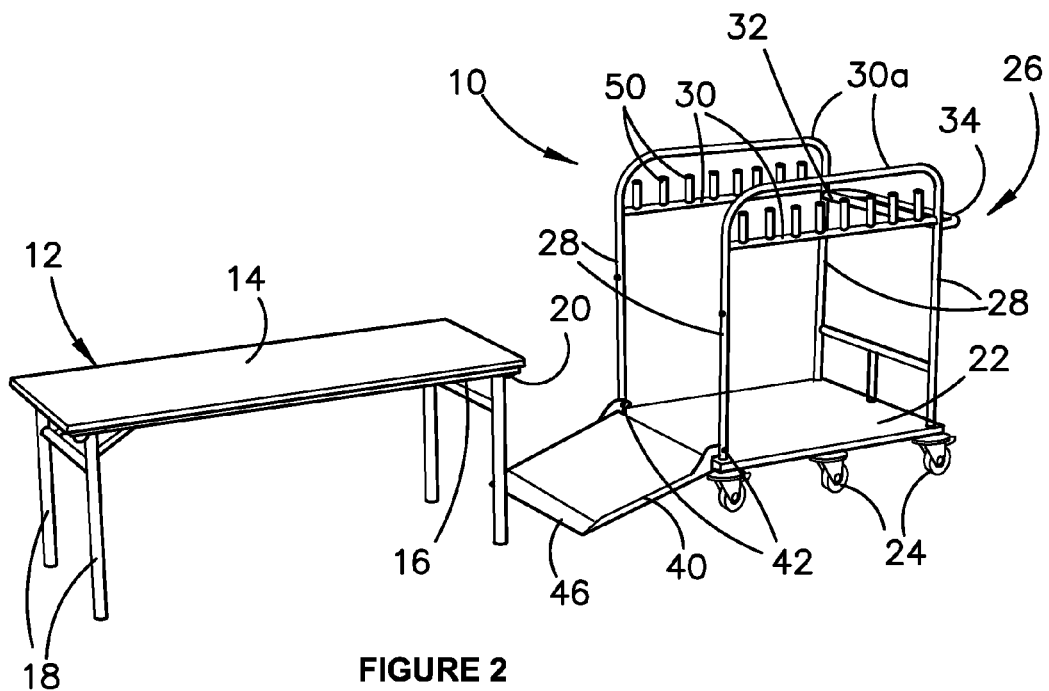
FIG. 2 is a perspective view of a table truck according to an embodiment of the present invention, with the ramp in the operative position, and a rollaway table in an in-use position.
Figure 3:
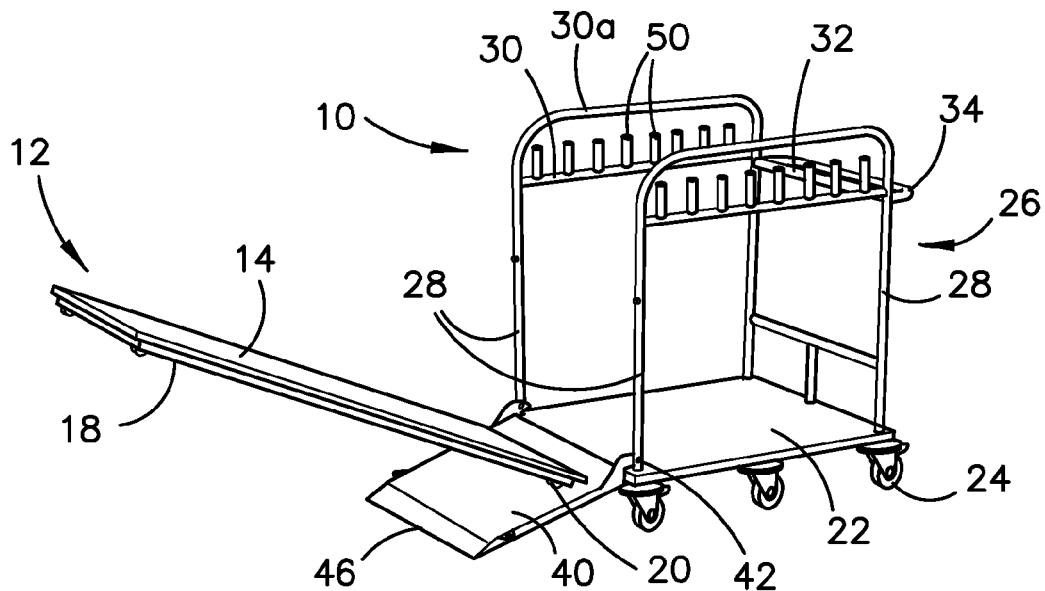
FIG. 3 is a perspective view of the table truck of FIG. 2, with a rollaway table being rolled up the ramp.
Figure 4:
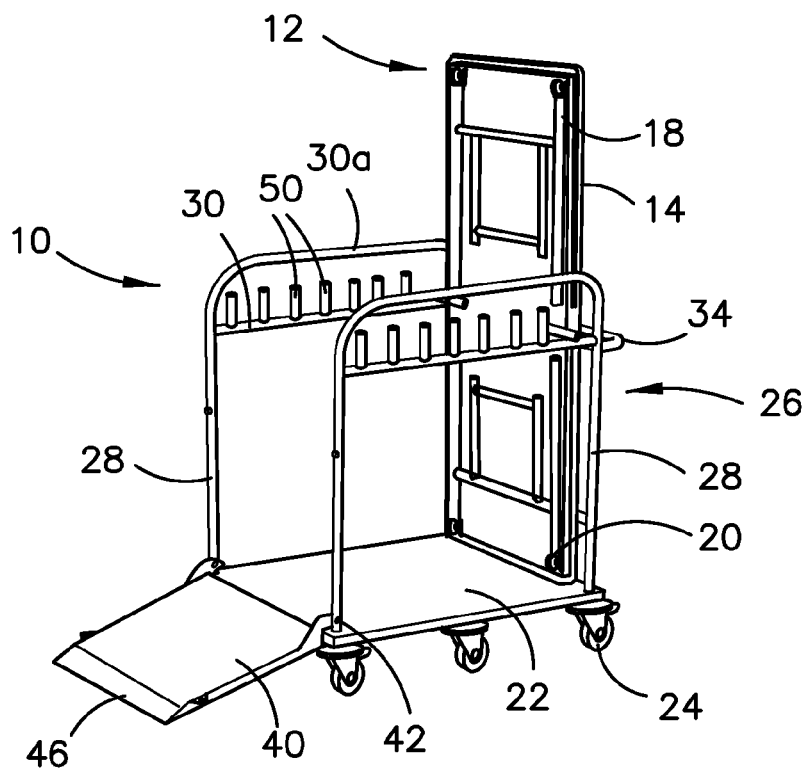
FIG. 4 is a perspective view of the table truck of FIG. 2, with a rollaway table in a rest location.
Figure 5:
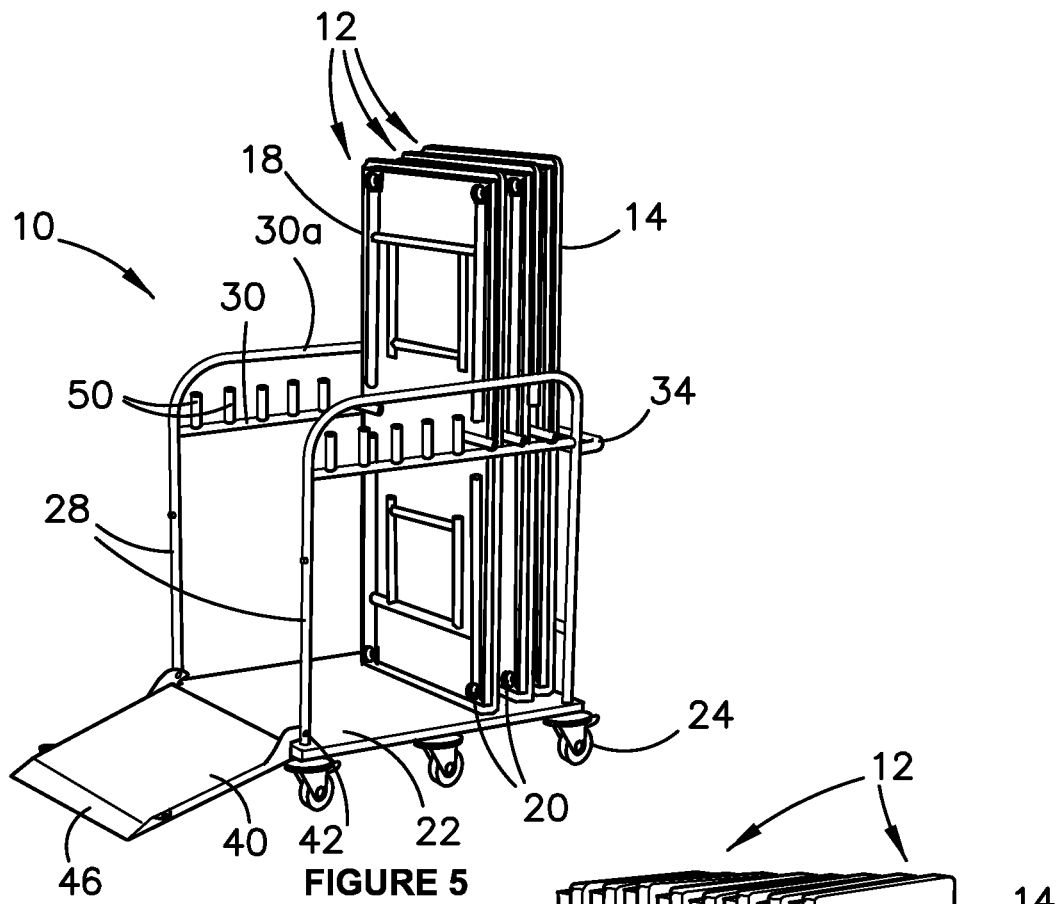
FIG. 5 is a perspective view of the table truck with three rollaway tables stacked on the base.
Figure 6:
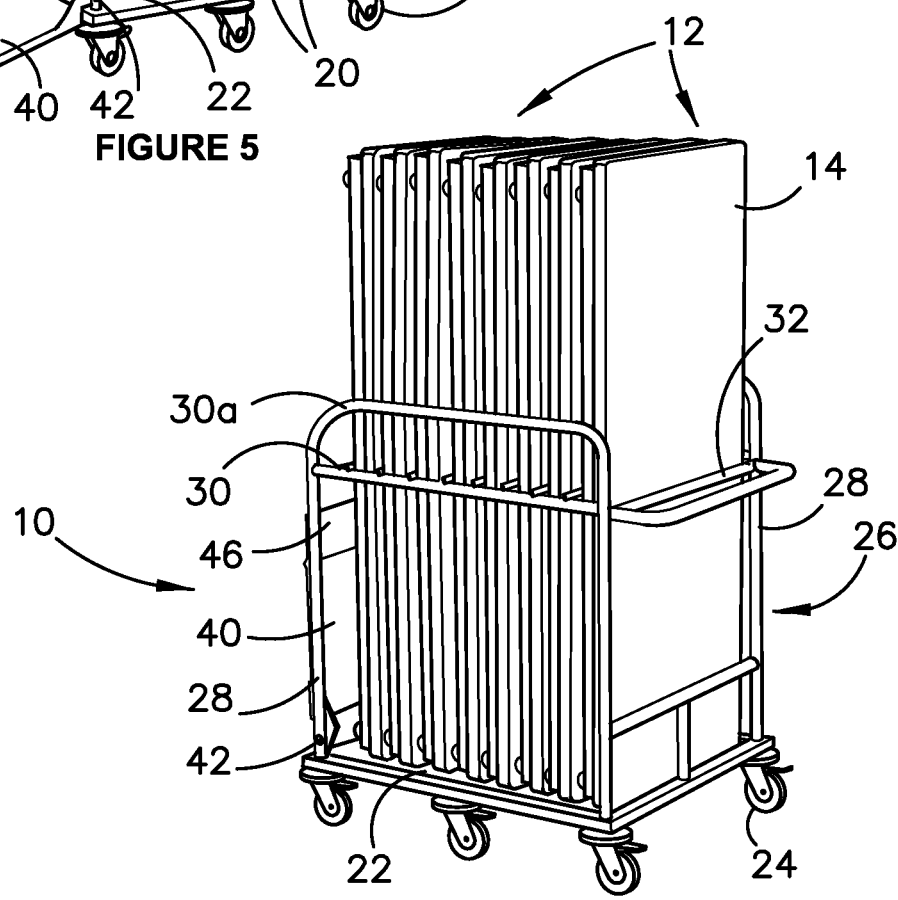
FIG. 6 is a perspective view of a table truck fully loaded with rollaway tables, with the ramp in the transport condition.

Means is provided on the frame 26, in the form of pivotal arms 50, defining respective rest locations for the respective tables when they are standing in a generally upright orientation on the base 22. Pairs of pivotal arms 50 are attached to the side cross beams 30. When rolling the first table onto the base, as shown in FIGS. 2 and 3, all of the arms 50 are in an inoperative position, where they do not project into the storage space and lie generally vertically, to allow the tables 12 to be rolled onto the base and abut against the rear frame cross beam 32. As a table 12 is rolled into position, as shown in FIG. 4, the first pair of arms 50 are pivoted down into an operative position, where they lie generally horizontally and project into the storage space to define the first rest location for the table in place.

As respective tables 12 are rolled onto the base 22, respective pairs of arms 50 are pivoted down behind the tables to define respective rest locations. To prevent damage to the table, arms 50 are covered with a suitably soft outer layer. After all of the tables are positioned on the base 22 in the frame 26, the ramp 40 is pivoted upward into the transport condition and the handle may be used to manoeuvre the table truck 10 into storage.

The advantage of the table truck according to the present invention is that it can be loaded and unloaded by a single person and can also be maneuvered into and out of storage by a single person. The pivotal arms space the tables apart to prevent damage during movement and storage and the ramp makes the tables easy to load and unload without the requirement to lift the tables at any stage.

It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. A table transport system comprising:
  a plurality of tables, each of the plurality of tables including a plurality of legs and a table surface that defines a table width, the plurality of legs configured to fold to a folded state for storage, each of the plurality of tables further including a roller rotatably mounted proximate to the table surface, the roller configured to support the table surface and the plurality of legs thereon in the folded state such that each of the plurality of tables is configured to be rolled along a ground surface by a user in the folded state; and a table truck comprising:
- a base with ground wheels or castors, wherein the base defines a base width;
- a frame projecting vertically upward from the base that defines a storage space configured to store the plurality of tables for transporting the plurality of tables therein;
- a ramp extending along the base width and projecting from the base in a direction transverse to the base width such that the ramp is configured to extend between the ground surface and the base and guide each of the plurality of tables in the folded state on the roller therealong between the ground surface and the base; and
- a plurality of pivotal arms projecting from the frame at respective locations spaced apart and positioned vertically upward from the base, wherein each of the plurality of pivotal arms is moveable between an inoperative position and an operative position, wherein each of the plurality of pivotal arms in the inoperative position does not project into the storage space to allow the plurality of tables to be rolled along the base and the ramp such that the table width extends along the base width, wherein each of the plurality of pivotal arms in the operative position projects into the storage space to define a plurality of respective rest locations within the storage space for each of the plurality of respective tables, wherein each of the plurality of rest locations is configured to horizontally support each of the plurality of tables, respectively, while the base is configured to vertically support each of plurality of tables such that each of the plurality of tables is oriented generally upright and projecting generally vertically upward on the base, wherein each of the plurality of rest locations is configured to orient the tables such that the table width is generally aligned with the base width, wherein the plurality of pivotal arms in the operative position is configured to be respectively between the plurality of tables such that the plurality of pivotal arms is configured to space the plurality of tables apart from each other for preventing the plurality of tables from contacting each other in storage.

2. The table transport system according to claim 1, wherein a respective pair of arms of the plurality of pivotal arms are configured to pivot down behind the respective tables as the plurality of roller-carrying tables are respectively rolled onto the base.

3. A table transport system according to claim 1, wherein the frame includes an upright member extending from each of the four corners of the base.

4. A table transport system according to claim 3, wherein the ramp is mounted to extend between two upright members on an open side of the frame.

5. A table transport system according to claim 4, wherein upper generally horizontal cross beams join the upright members on three sides of the base, to leave an open side of the frame, and therefore are two side cross beams and one rear cross beam.

6. A table transport system according to claim 5, wherein the rear cross beam(s) define a handle for manually maneuvering the table truck.

7. A table transport system according to claim 5, wherein the pivotal arms are mounted to the two side cross beams of the frame.

8. A table transport system according to claim 1, wherein each individual pivotal arm is separately moveable.

\* \* \* \* \*